United States Patent [19]
Cremona

[11] Patent Number: 5,201,258
[45] Date of Patent: Apr. 13, 1993

[54] AUTOMATED CUTTING STATION FOR WOOD BLANKS

[75] Inventor: Lorenzo Cremona, Monza, Italy

[73] Assignee: Angelo Cremona & Figlio S.p.A., Monza, Italy

[21] Appl. No.: 837,930

[22] Filed: Feb. 20, 1992

[30] Foreign Application Priority Data

Feb. 21, 1991 [IT] Italy .............................. MI91A000455

[51] Int. Cl.⁵ .......................... B26D 1/06; B26D 7/06
[52] U.S. Cl. ........................................ 83/75.5; 83/76.9;
83/155; 83/157; 83/404; 83/697; 144/3 R;
144/242 E; 144/245 R; 144/245 B; 144/357;
364/474.09
[58] Field of Search ...................... 83/404.1, 76.9, 75.5,
83/157, 371, 76.8, 404.4, 404, 697, 155; 144/3
R, 357, 242 E; 364/474.13, 474.09

[56] References Cited

U.S. PATENT DOCUMENTS

| | | | |
|---|---|---|---|
| 3,780,777 | 12/1973 | Davies | 83/371 X |
| 3,931,501 | 1/1976 | Barr et al. | 364/474.09 |
| 4,148,344 | 4/1979 | Critchell et al. | 83/371 X |
| 4,317,397 | 3/1982 | Ess | 83/404.1 X |
| 4,341,135 | 7/1982 | Ufermann et al. | 83/404.2 X |
| 4,381,686 | 5/1983 | Ess | 83/157 X |
| 4,758,960 | 7/1988 | Jung | 83/75.5 X |
| 4,794,963 | 1/1989 | Oppeneer | 83/75.5 X |
| 4,947,909 | 8/1990 | Stroud | 83/76.8 X |
| 4,977,805 | 12/1990 | Corley, III | 83/76.9 X |
| 5,042,341 | 8/1991 | Greten et al. | 83/75.5 |

Primary Examiner—Frank T. Yost
Assistant Examiner—Kenneth E. Peterson
Attorney, Agent, or Firm—Keck, Mahin & Cate

[57] ABSTRACT

A station (10) for cutting sheets of wood (13), and in particular for cutting packages of sheets, includes a first device (12) for positioning a package of sheets under a first cutter (15) so as to separate parts of the package sequentially. A further device (14) takes the cut part and sends it to a second cutter (17) for sequentially cutting the part along a second direction so as to obtain another division in subparts sequentially and selectively conveyed outside the station. Electronic controls are used to manage operation of the cutters and the positioning and taking devices for performing the cuts in accordance with a previously set grid of cuts.

19 Claims, 5 Drawing Sheets

AUTOMATED CUTTING STATION FOR WOOD BLANKS

In the known art of cutting packages of wood blanks there is presently used a sequence of different machines to each of which are assigned one or more operators.

For example, the structure of a cutting line is generally made up of a first station comprising a first cutter operated by a first operator to make the necessary transverse cuts, a second station comprising a second cutter operated by another operator to make the necessary longitudinal cuts from one side of the blanks, a third station comprising a third cutter operated by a third operator to make the necessary longitudinal cuts on the opposite side of the blanks. Lastly, there is present a last cutter for cutting off the head of the blanks. Said cutter is usually operated by the same operator as the third cutter, who must thus alternate between the two stations.

It is clear that both the space occupied by said multitude of stations and the number of operators necessary in addition to those assigned to loading and unloading the blanks made the cutting process very long and costly. In addition the work of the operators is laborious and tiring because of the manual moving of the blank they must necessarily perform. On one hand this reduces production and on the other reduces the safety level, already low, of performance of the cuts.

The general purpose of the present invention is to obviate the above mentioned shortcomings by providing a single cutting station for wood blanks which would perform rapidly and with minimal human assistance all the cutting operations required by packages of blanks while reducing space occupied, management costs and operator fatigue and increasing safety of use.

In view of said purpose it is sought to provide in accordance with the present invention a wood sheet cutting station, in particular for packages of blanks, characterized in that it comprises in combination first means of positioning a package of sheets under a first cutter cutting along a first direction and operated to separate sequentially parts of the package, means of taking the cut part and sending it to a second cutter for sequential cutting of the part along a second direction substantially normal to the first to obtain another division in subparts sequentially and selectively conveyed outside the station, electronic control means being connected to the positioning means, the taking means and cutters to control their operation in positioning and performing cuts on the package in programed positions by setting a grid of cuts.

To further clarify the explanation of the innovative principles of the present invention and its advantages as compared with the known art there are described below with the aid of the annexed drawings possible embodiments as nonlimiting examples applying said principles. In the drawings.

Figure 1:
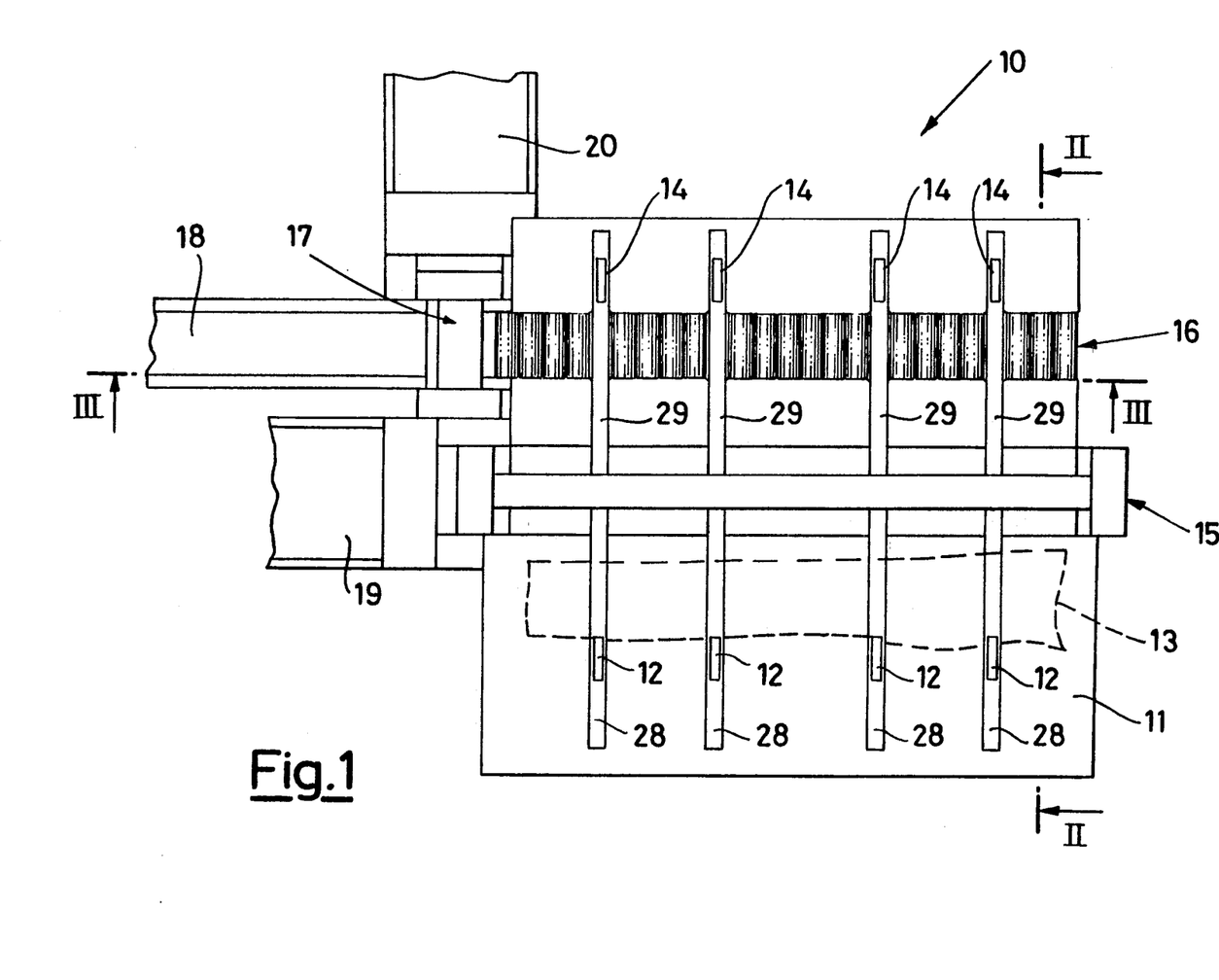
FIG. 1 shows a schematic plan view of a cutting station provided in accordance with the present invention.

With reference to the figures FIG. 1 shows schematically as a whole and indicated by reference number 10 a station in accordance with the present invention. Said station 10 comprises a supporting table 11 for a package, shown in broken lines and indicated by reference number 13, of blanks to be cut. In said table 11 run front clamps 12 and rear clamps 14 for movement of the package 13 under a first longitudinal cutter 15. A running conveyor 16, for example the roller type, conveys by means of the clamps 14 that which is deposited thereon to a transverse cutter 17 at the output of which a conveyor belt 18 conveys the cut blanks to unloading. Additional conveyors 19, 20 evacuate the scrap produced by the cutter 15 and the cutter 17 respectively.

Figure 2:
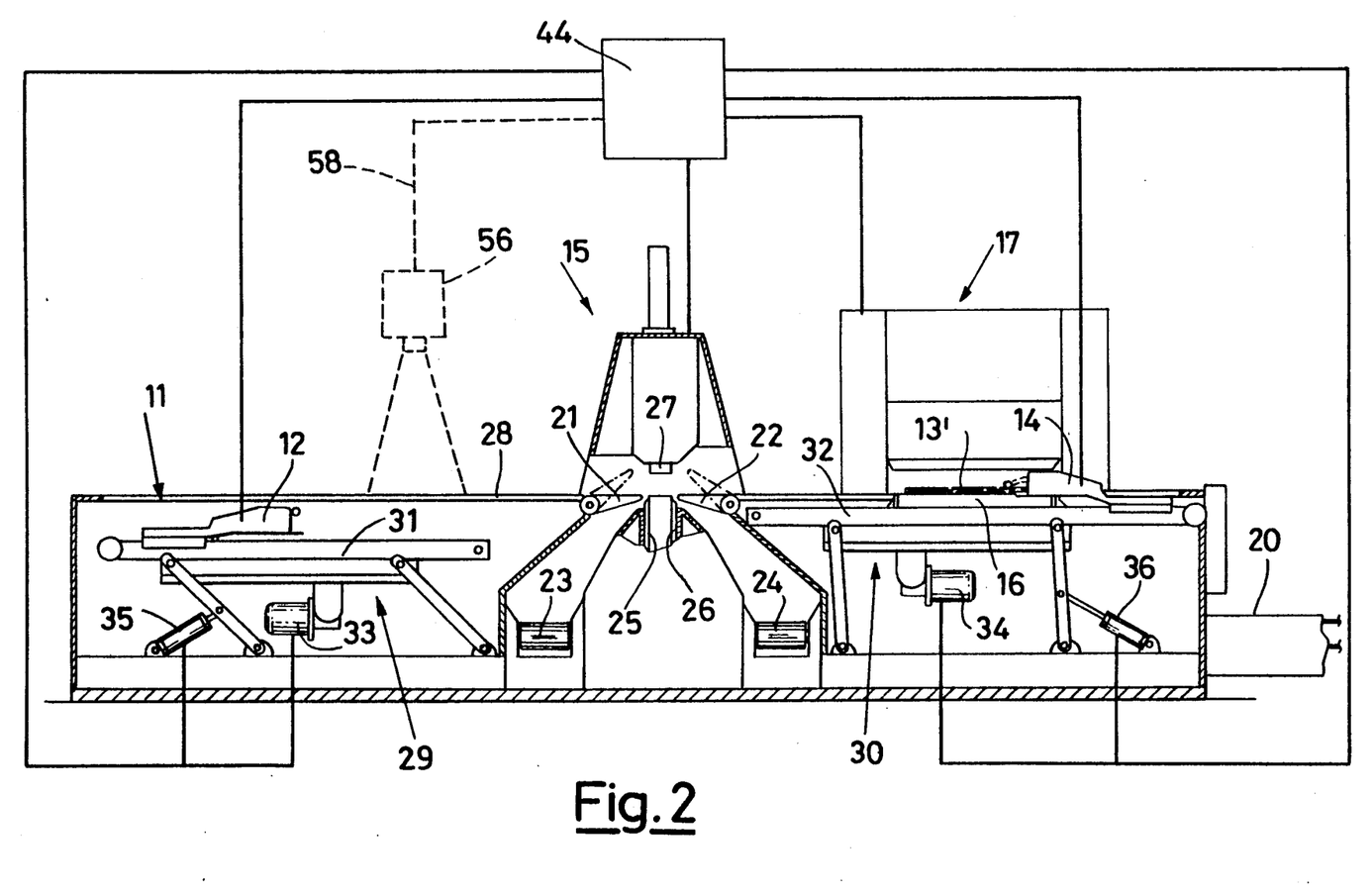
FIG. 2 shows a schematic cross section view along plane of cut II—II of FIG. 1.

As may be seen in FIG. 2, the longitudinal cutter 15 comprises mobile sorting fins 21 and 22 to turn aside through appropriate channels the scrap from the cutter to the conveyor 19 and initially composed of two conveyor belts 23 and 24 upstream and downstream of the cutter. Advantageously the cutter has a pair of blades 26, 25 having opposed cutting edges for performance of a precision cut at the front and rear respectively of the package of blanks. In an innovative manner the pair of blades 25, 26 is placed beneath the cutting table and the corresponding presser 27 is arranged above the blades and is movable vertically to press on the upper surfaces of the package to be cut. Such an original arrangement allows provision in the table 11 with ease slots 28, 29 for the clamp guides 12 and 14.

The presser 27 can have bucking edges of metal or plastic such as 'Vulcolan'. In the former case resistance to wear is greater while in the second case cuts are more accurate and this is useful when using sheets cut for splicing without rework.

The clamps 12 and 14 are substantially moved together. The group of front clamps 12 and the group of rear clamps 14 are supported each by respective parallelogram frames 29, 30 moving by pistons 35, 36 from an operative position, shown in FIG. 2 for the frame 30, to a nonoperative position, shown in FIG. 2 for the frame 29. The frames 29, 30 comprise guides 31 and 32 each individually powered for horizontal running of a clamp by respective motors 33 and 34 as may be seen in FIG. 3 for the clamps 14.

Figure 3:
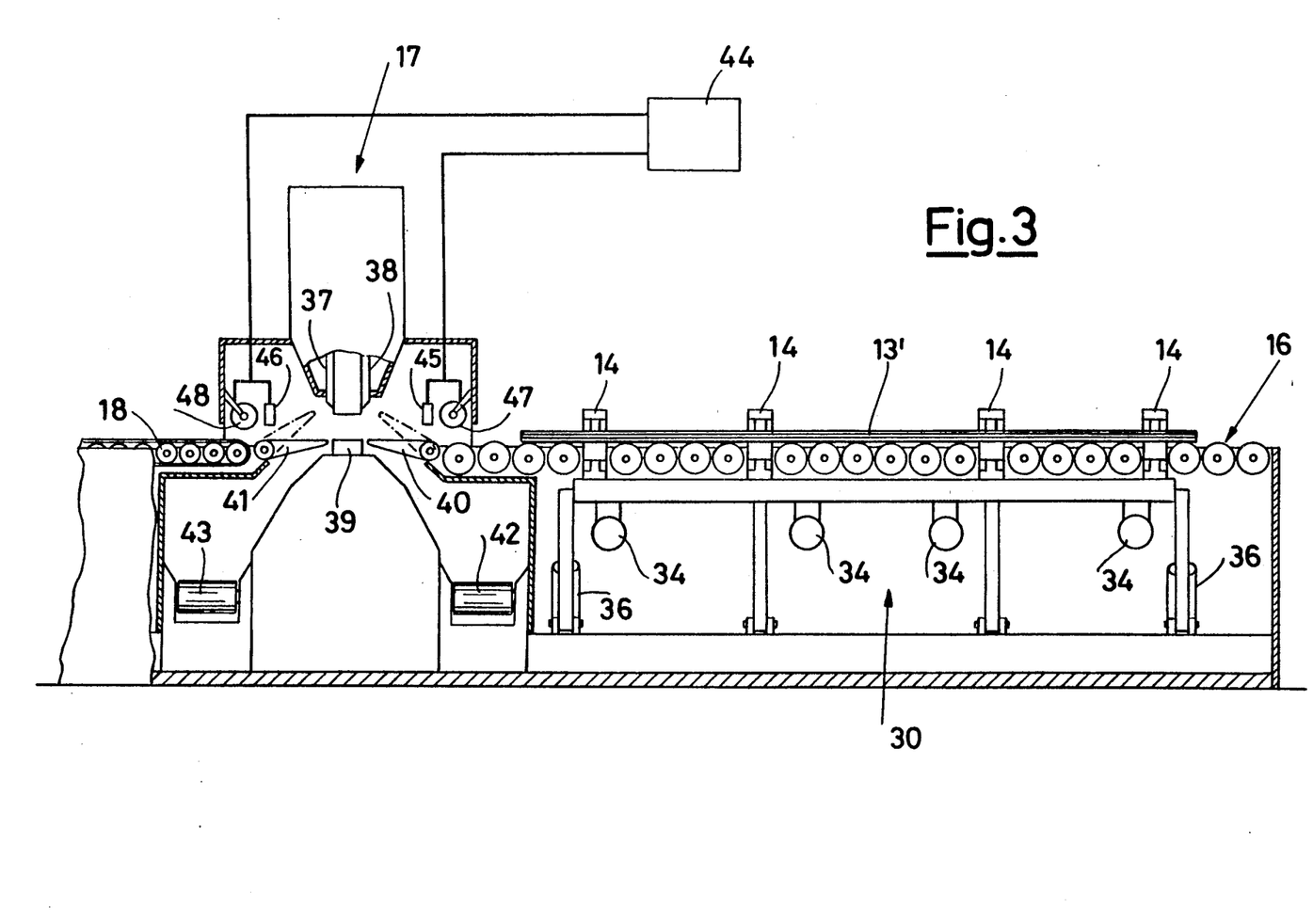
FIG. 3 shows a schematic cross section view along plane of cut III—III of FIG. 1.

As may be seen in FIG. 3, the transverse cutter 17 comprises two upper blades 37 and 38 always with opposed cutting edges for the precision cuts at the head and tail of the packages with the help of a presser with fixed counterblade 39. In addition the cutter 17 comprises movable sorting fins 40 and 41 to turn aside with appropriate channels the scrap from the cutter to a conveyor 20 initially made up of two conveyor belts 42 and 43 upstream and downstream of the cutter.

Operation of the various parts of the above described station is managed by an electronic control device, e.g. with microprocessor, of the known art and therefore not further shown or described since it is readily imaginable by those skilled in the art especially in the light of the following description of its operation. Among the various sensors and devices managed the control device 44 is connected also to photoelectric cell sensors 45 and 46 and to position encoders 47, 48 positioned upstream and downstream of the cutter 17 for purposes which are clarified below.

Figure 4:
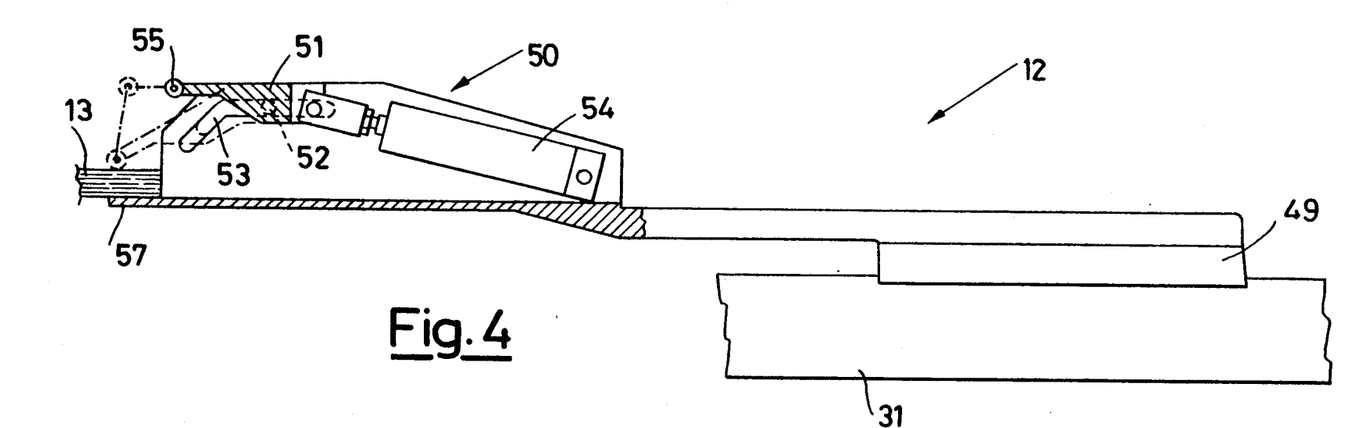
FIG. 4 shows a schematic partial cross section view along plane of cut IV—IV of FIG. 5 of a detail of the station of FIG. 1.
Figure 5:
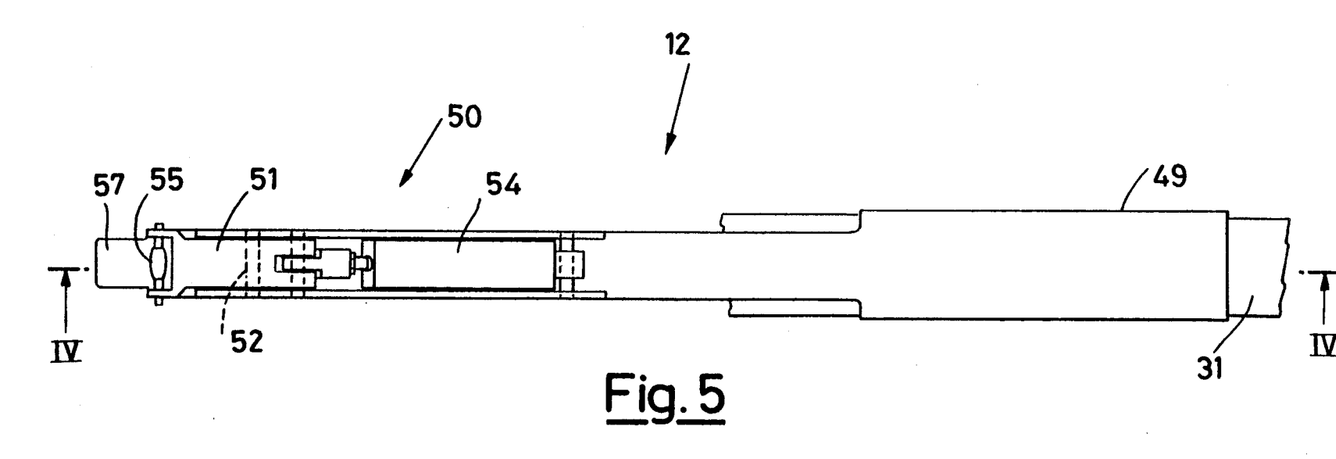
FIG. 5 shows a schematic partial plan view of the detail of FIG. 4.

FIGS. 4 and 5 show in greater detail a clamp, e.g. a gripping clamp 12, the clamp 14 being of the same design. As may be seen, the clamp comprises a slide 49 for running on the guide 31, by the above mentioned motor 33, and a head 50 comprising an element with cam sliding by means of a pin 52 in a slot 53 under the effect of a piston 54 to bring one gripping end, advantageously provided like a gripping roller generally in the form of a drum, from a nonoperative position, shown in unbroken lines in FIG. 4, to a gripping position on a package 13, shown in broken lines in FIG. 4, against a lower stop 57.

Returning to FIG. 2 the station 10 comprises in addition means 56 sending signals 58 to the device 44 to allow programming of the station along a particular series of cuts on a package. As described in greater detail below said means 56 can be part of a viewing or laser scanning system or the like for automatic, semiautomatic or manual programming of the position of the cutting sequence.

In use of the station a package of wood blanks to be cut is fed onto the table 11 manually or by conveyor belt of the known art and therefore not shown. The control system 44 then raises the clamps 12 by operation of the pistions 35 and advances them with the motors 33 until they are even with the edge of the package and then lowers their gripping end 55. In this manner the package is firmly held by the clamps which arrange it under the cut-setting means 56 while advancing. For example, once the control device 44 has received by methods described below the data for the cuts to be performed the clamps advance further to bring the package under the cutter 15 which is then commanded to perform in sequence all the preset longitudinal cuts. Between one cut and the next the clamps can advance independently of each other so as to perform also if necessary mutually oblique cuts.

Initially a first trimming cut is performed on the longitudinal edges of the package. For this purpose the blade 26 is used and the scrap obtained is turned aside by movement of the fins 22 onto the belt 24 by which it is sent to the belt 19 to be evacuated from the station. The clamps 14 are raised and advanced to grip the sheared part emerging from the cutter 15. The clamps position the blank and the cutter is commanded to perform the cut. The piece cut downstream from the cutter 15 is then conveyed by the clamps 14 as shown by 13' in FIGS. 2 and 3 onto the roller conveyor 16 from which it is conveyed to the cutter 17. The photoelectric cell 45 detects the head of the package arriving at the cutter 17 and enables reading of the encoders 47, 48 to ascertain reaching of a predetermined transverse cutting position. Then the blade 38 is operated to trim the head of the blank and the corresponding scrap is evacuated by operation of the fins 40 and the belts 42 and 20. Advance of the blank 13' continues and the encoders and the photoelectric cells 45, 46 allow ascertaining of the position reached in each instant by the blank 13' so that the control device 44 continues to command operation of the cutter 17 to perform all the transverse cuts ascertained for the sheared piece 13'. As the cut subparts emerge from the cutter 17 they are conveyed along the conveyor 18, for example to the storing, packing or similar means of the known art hence not shown. If in the cutting programme there are identified in the wood defects to be eliminated the cut piece containing a defect is evacuated by operation of the fin 41.

The last transverse cut is performed by the blade 37 so as to trim the tail of the package of blanks 13' and the scrap is evacuated again by the fin 41.

During the above transverse cutting operations of the piece 13' the longitudinal cutter 15 is operated to provide the next programmed cut so as to supply sequentially at the outlet another piece which will be conveyed to the cutter 17 after completion of the cutting of the preceding piece 13'. For this reason, during cutting of the piece 13' the clamps 14 are lowered to translate thereunder and return to the advanced position to grip the part of the package in simultaneous cut under the cutter 15.

The cutter operations described proceed then until completion of the longitudinal cuts of the package 13. Any defects in the wood detected during setting of the cuts and which can be eliminated by longitudinal cuts will be removed by cutting the longitudinal strip containing them and sending them to scrap by operation of the fin 40. The last cut will be performed by the blade 25 to trim the second longitudinal edge of the package and the scrap will be eliminated by operation of the fin 21.

A new package can then be positioned on the table 11, from which the clamps 12 have withdrawn by operation of the pistons 35, and a new cutting program can be started. It is clear at this point that a station in accordance with the present invention can automatically cut the wood blanks both transversely and longitudinally and supply from the output of the tape 18 a sequence of accurately cut parts and from the belts 19, 20 wood scrap generated. The sequence of cuts to obtain cut parts as desired and to eliminate the parts containing defects can be set on the control device 44 by various procedures, each satisfying a certain type of requirement.

Figure 6:
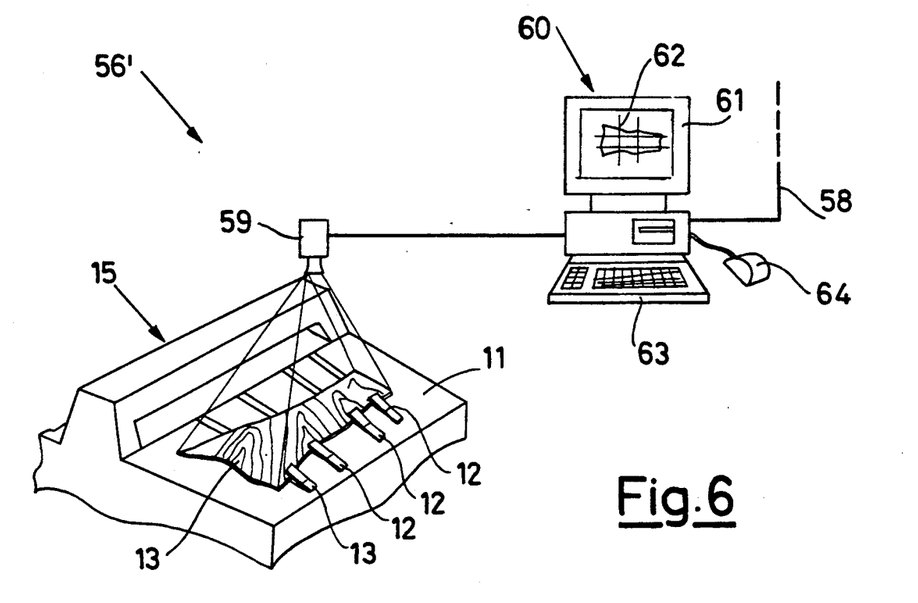
FIG. 6 shows a schematic view of first cut programming means for the station of FIG. 1.
Figure 7:
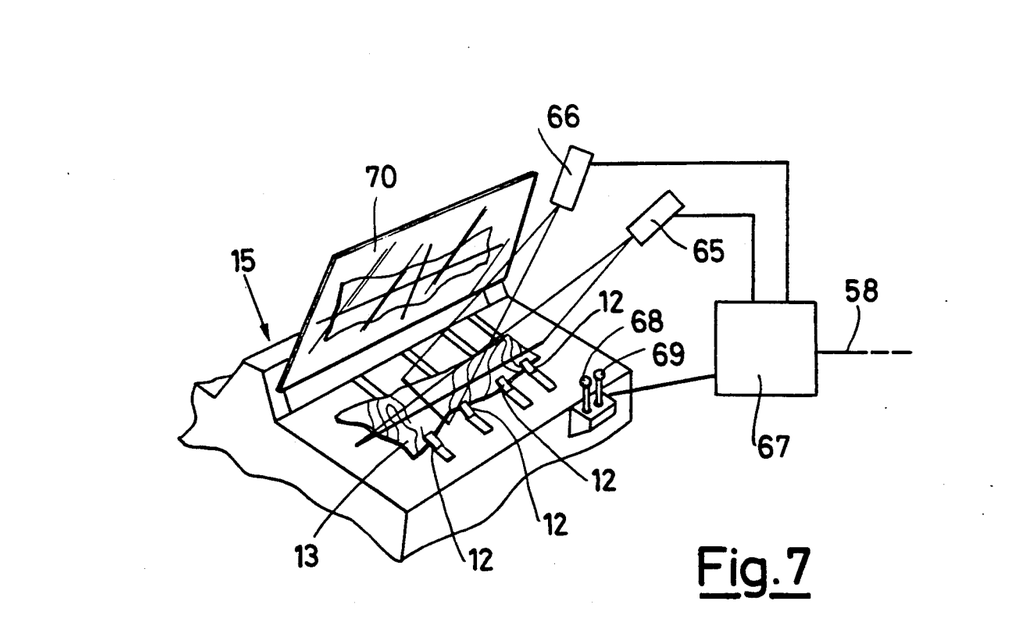
FIG. 7 shows a schematic view of second cut programming means for the station of FIG. 1.

For example, FIG. 6 shows schematically a first possible embodiment, indicated by reference number 56', of the means 56 of FIG. 2. The embodiment 56' comprises a telecamera 59 sending the image of the package 13, placed on the table 11, to a processing unit 60 having a screen 61 reproducing the image. The operator can trace the lines 62 representing a cutting grid and adapted to the position of the defects and the shape of the package, for example with a keyboard 63 or another input device such as a mouse or a graphics pad. In addition, again with the same input devices, the operator can indicate which parts of the board are to be scrapped. On the basis of these data the processor 60 sends to the control device 44 the coordinates of the package on which to sequentially perform the various cuts and which parts to scrap by operation of the various fine 21, 22, 40, 41. As is readily immaginable for those skilled in the art, it is also possible to program the processing unit 60 so that it automatically detects in a known manner the position of defects in the wood and independently selects an optimal cutting grid, relieving the operator of this duty also. FIG. 7 shows schematically a second alternate embodiment, indicated by 56", of the means 56 of FIG. 2.

The embodiment 56" comprises means 65, 66 of controlled laser light emission to trace on the surface of the package to be cut longitudinal and transverse lines respectively. Said means can be for example provided by laser sources with cylindrical lens to project lines on the surface of the package and by powered operations for moving of the lines along the surface thereof. Said laser scanning devices are of the known art and accordingly are not described further since they are readily immaginable by those skilled in the art.

Direction of the laser source is controlled by an electronic control device to which arrive setting signals emmited by manual controls 68 for the transverse lines and 69 for the longitudinal lines.

To see comfortably the position of the laser lines projected on the package, there is placed thereover obliquely a mirror 70 in which the operator can see the reflected image.

In use the operator operates the controls 68 and 69 to position the lines even with the required cuts and send said data to the control device 44 for execution thereof. Depending on the characteristics of the means 65 and 66 selected, projection can be performed to obtain a single transverse line and a single longitudinal line at a time, representing two cuts during selection, or see the lines of the two cuts during selection and the lines corresponding to the cuts already selected.

As an alternative there can be used a means 65 projecting a fixed longitudinal line and the controls 69 can control the position of the clamps 12 to rotate and translate the package under the line.

To identify which cut parts are to be eliminated the operator can for example use a keyboard indicating device or the like or control the scrap in real time during cutting.

It can also be immagined to use in place of the mirror a telecamera and a screen, e.g. as already shown in FIG. 6. In this manner it is also possible to indicate on the screen the parts to be scrapped similarly to that which was described with reference to the embodiment of FIG. 6. It is clear at this point that it is possible to provide a system for setting the cuts to be made.

Naturally the above description of an embodiment applying the innovative principles of the present invention is given merely by way of example and therefore is not to be taken as a limitation of the patent right claimed here. For example the structure of the station can be modified depending on the general dimensions of the packages it is desired to process.

The clamps 14 can also be provided running on fixed guides while giving up optimization of the processing times obtained by rapid return of the clamps 14 and the resulting performance of a new longitudinal cut while the transverse cuts on a piece 13' are being performed. Although it is preferable that the clamps 12 be retractable and disappearing in the table 11 so as to allow loading without obstacles of a package on the table 11, they too can be provided running on fixed guides. In addition, the cut presetting systems can be varied and even combined with each other compared with the above description as is readily immaginable to those skilled in the art. For example, the telecamera 59 can be of the linear type and hence moving to scan the entire surface of the package, or with matrix. Viewing on the viewer can be total or divided in a sequence of partial images to save memory in the processing unit 60.

I claim:

1. Wood sheet cutting station for packages of blanks comprising in combination:
    a first cutter,
    a second cutter,
    first means for positioning a package of sheets under said first cutter cutting along a first direction and operated to sequentially cut parts of the package,
    means for taking the cut part and sending the cut part to said second cutter for sequential cutting of the part along a second direction, substantially normal to the first direction, to obtain another division in subparts sequentially and selectively conveyed outside the station,
    electronic control means connected to the means of positioning, to the means for taking and to the cutters to control operation thereof in positioning and performing cuts on the package in programmed positions by setting a grid of cuts, wherein
    the positioning means comprises first clamps for gripping on a top side of the package and commanded to run along guides between a nonoperative position and a position for positioning of the package under the first cutter, and
    the taking means comprises an unpowered conveyor leading to the second cutter and second gripping clamps commanded to run along guides between a gripping position on a top side of the cut part of the package released by said first cutter and a position for release thereof on said unpowered conveyor.

2. Station in accordance with claim 1 characterized in that the setting means comprises a telecamera for picturing a surface of the package and said telecamera is connected to devices for processing the image taken.

3. Station in accordance with claim 2 characterized in that said processing devices for the image comprise systems for identification of a plan form of the package and defects in the wood and means of calculation of a cutting grid isolating in parts and subparts of the package said defects and said processing devices sending coordinates for the cuts belonging to said grid to said electronic control means.

4. Station in accordance with claim 2 characterized in that the image processing devices comprise manual means for tracing lines on a screen identifying a corresponding cutting grid to be executed.

5. Station in accordance with claim 1 characterized in that the setting means comprise directional light sources projecting upon manual command luminous lines on the package to visualize thereby the required cutting lines.

6. Station in accordance with claim 5 charaterized in that the setting means comprises directional sensors for said sources for sensing the relative positions of the luminous lines on the package and said setting means sends to the electronic control means signals for coordinates corresponding to said positions as cutting coordinates.

7. Station in accordance with claim 5 characterized in that image processing devices detect the relative positions of said luminous lines on an image filmed and send to the electronic control means signals for coordinates corresponding to said positions as cutting coordinates.

8. Station in accordance with claim 1 characterized in that the electronic control mean comprises sensors for sensing the position of a cut part approaching the second cutter.

9. Station in accordance with claim 7 characterized in that the guides of the first gripping clamps are movable by moving means between an operative or gripping position bearing the clamps even with a running table for the package and a nonoperative position bearing the clamps spaced from said table.

10. Station in accordance with claim 9 characterized in that the moving means comprise an articulated parallelogram lift arranged under the package running table.

11. Station in accordance with claim 1 characterized in that the guides are perpendicular to the direction of cut of the first cutter.

12. Station in accordance with claim 1 characterized in that the unpowered conveyor is perpendicular to the cutting direction of the second cutter.

13. Station in accordance with claim 1 characterized in that the guides of the second gripping clamps are movable by moving means between an operative or gripping position bearing the clamps even with a running table for the cut parts and a nonoperative position bearing the clamps spaced from said table.

14. Wood sheet cutting station for packages of blanks comprising in combination:
a first cutter,
a second cutter,
first means for positioning a package of sheets under said first cutter cutting along a first direction and operated to sequentially cut parts of the package,
means for taking the cut part and sending the cut part to said second cutter for sequential cutting of the part along a second direction, substantially normal to the first direction, to obtain another division in subparts sequentially and selectively conveyed outside the station,
electronic control means connected to the means of positioning, to the means for taking and to the cutters to control operation thereof in positioning and performing cuts on the package in programmed positions by setting a grid of cuts, wherein
the taking means comprises an unpowered conveyor leading to the second cutter and second gripping clamps commanded to run along guides between a gripping position on a top side of the cut part of the package released by said first cutter and a position for release thereof on said unpowered conveyor, the guides of the second gripping clamps are movable by moving means between an operative or gripping position bearing the clamps even with a running table for the cut parts and a nonoperative position bearing the clamps spaced from said table, and the moving means comprise an articulated parallelogram lift arranged under the running table of the cut parts.

15. Wood sheet cutting station for packages of blanks comprising in combination:
a first cutter,
a second cutter,
first means for positioning a package of sheets under said first cutter cutting along a first direction and operated to sequentially cut parts of the package,
means for taking the cut part and sending the cut part to said second cutter for sequential cutting of the part along a second direction, substantially normal to the first direction, to obtain another division in subparts sequentially and selectively conveyed outside the station,
electronic control means connected to the means of positioning, to the means for taking and to the cutters to control operation thereof in positioning and performing cuts on the package in programmed positions by setting a grid of cuts, wherein
the taking means comprises an unpowered conveyor leading to the second cutter and second gripping clamps commanded to run along guides between a gripping position on a top side of the cut part of the package released by said first cutter and a position for release thereof on said unpowered conveyor, and each clamp comprises an element running with a cam pin in a slot under the effect of a linear drive between a position bearing its clamping and drawing near to a corresponding stop for blocking therebetween the cut part and a release position with said gripping end withdrawn from said stop.

16. Station in accordance with claim 15 characterized in that the gripping end comprises a gripping roller shaped generally like a barrel.

17. Wood sheet cutting station for packages of blanks comprising in combination:
a first cutter,
a second cutter,
first means for positioning a package of sheets under said first cutter cutting along a first direction and operated to sequentially cut parts of the package,
means for taking the cut part and sending the cut part to said second cutter for sequential cutting of the part along a second direction, substantially normal to the first direction, to obtain another division in subparts sequentially and selectively conveyed outside the station,
electronic control means connected to the means of positioning, to the means for taking and to the cutters to control operation thereof in positioning and performing cuts on the package in programmed positions by setting a grid of cuts, wherein
the positioning means comprises first clamps for gripping on a top side of the package and commanded to run along guides between a nonoperative position and a position for positioning of the package under the first cutter, and each clamp comprises an element running with a pin and cam in a slot under the effect of a linear drive between a position bearing one gripping clamp end at a corresponding stop for blocking therebetween the package and a release position with said gripping end withdrawn from said stop.

18. Station in accordance with claim 17 characterized in that the gripping end comprises a gripping roller shaped generally like a barrel.

19. Wood sheet cutting station for packages of blanks comprising in combination:
a first cutter,
a second cutter,
first means for positioning a package of sheets under said first cutter cutting along a first direction and operated to sequentially cut parts of the package,
means for taking the cut part and sending the cut part to said second cutter for sequential cutting of the part along a second direction, substantially normal to the first direction, to obtain another division in subparts sequentially and selectively conveyed outside the station,
electronic control means connected to the means of positioning, to the means for taking and to the cutters to control operation thereof in positioning and performing cuts on the package in programmed positions by setting a grid of cuts, wherein
the positioning means comprises first clamps for gripping on a top side of the package and commanded to run along guides between a nonoperative position and a position for positioning of the package under the first cutter, the taking means comprises an unpowered conveyor leading to the second cutter and second gripping clamps commanded to run along guides between a gripping position on a top side of the cut part of the package released by said first cutter and a position for release thereof on said unpowered conveyor, the setting means comprises a telecamera for picturing a surface of the package and said telecamera is connected to devices for processing the image taken, the image processing devices comprise manual means for tracing lines on a screen identifying a corresponding cutting grid to be executed, and the manual tracing means comprises an input keyboard for position commands of said lines on the screen.

* * * * *